United States Patent
Clare et al.

(10) Patent No.: US 12,339,374 B2
(45) Date of Patent: Jun. 24, 2025

(54) GNSS LOCATION DETERMINATION USING A VIRTUAL ANTENNA

(71) Applicant: Trimble Inc., Westminster, CO (US)

(72) Inventors: Adam Clare, Westminster, CO (US); Shawn Weisenburger, Westminster, CO (US); Greg Wallace, San Francisco, CA (US); Gleb Zyryanov, Moscow (RU)

(73) Assignee: Trimble Inc., Westminster, CO (US)

( * ) Notice: Subject to any disclaimer, the term of this patent is extended or adjusted under 35 U.S.C. 154(b) by 364 days.

(21) Appl. No.: 18/091,674

(22) Filed: Dec. 30, 2022

(65) Prior Publication Data

US 2024/0219576 A1   Jul. 4, 2024

(51) Int. Cl.
*G01S 19/14* (2010.01)
*G01S 19/42* (2010.01)

(52) U.S. Cl.
CPC .............. *G01S 19/14* (2013.01); *G01S 19/42* (2013.01)

(58) Field of Classification Search
CPC ................................. G01S 19/14; G01S 19/42
USPC ..................................................... 342/357.52
See application file for complete search history.

(56) References Cited

U.S. PATENT DOCUMENTS

| | | | | |
|---|---|---|---|---|
| 7,310,062 | B1* | 12/2007 | Hwang | G01S 19/215 342/357.59 |
| 2017/0350988 | A1 | 12/2017 | Nakamura et al. | |
| 2018/0284287 | A1 | 10/2018 | Kim et al. | |
| 2020/0132862 | A1 | 4/2020 | Toda et al. | |
| 2021/0333415 | A1 | 10/2021 | Morton et al. | |
| 2024/0219576 | A1* | 7/2024 | Clare | G01S 19/42 |

FOREIGN PATENT DOCUMENTS

| | | | | |
|---|---|---|---|---|
| CN | 102998689 B | * | 9/2016 | |
| CN | 106443746 A | * | 2/2017 | G01S 19/55 |
| CN | 110850400 A | * | 2/2020 | G01S 13/38 |
| CN | 113805209 A | | 12/2021 | |
| CN | 115308682 A | * | 11/2022 | |

(Continued)

OTHER PUBLICATIONS

Extended European Search Report for Application No. 23217764. 2-1206, mailed Jun. 10, 2024, 21 pages.

(Continued)

*Primary Examiner* — Harry K Liu
(74) *Attorney, Agent, or Firm* — Kilpatrick Townsend & Stockton LLP (57) ABSTRACT

A receiver system for determining coordinates of a location can include two GNSS receiver antennas positioned in fixed relation to each other and separated by a short baseline. Signals received from the two receiver antennas can be processed to define a "virtual" antenna located at the midpoint between the two receiver antennas. For instance, a location can be determined for each receiver antenna using GNSS-based techniques, and the locations of the two antennas can be used to determine a location of the virtual antenna. As another example, GNSS observables from the two antennas can be combined to provide a set of "virtual" observables for the virtual antenna, and GNSS-based techniques can be applied to the virtual observables to determine a location of the virtual antenna.

21 Claims, 6 Drawing Sheets

(56) References Cited

FOREIGN PATENT DOCUMENTS

CN           116540285 A   *   8/2023
WO      2020/041383 A1       2/2020

OTHER PUBLICATIONS

Extended European Search Report for Application No. 23217758.4-1206, mailed May 29, 2024, 11 pages.
Moradi, R. et al., "Reducing GPS Wide Lane Ambiguity Resolution Time: A Novel Carrier Phase Multipath Mitigation Technique", ITM 2013—Proceedings of the 2013 International Technical Meeting of the Institute of Navigation, San Diego, CA, Jan. 27, 2013, pp. 343-350.

* cited by examiner

GNSS LOCATION DETERMINATION USING A VIRTUAL ANTENNA

TECHNICAL FIELD

The present disclosure relates generally to location determination using a global navigation satellite system (GNSS) and in particular to location determination using a virtual receiver antenna based on data from two or more physical receiver antennas.

BACKGROUND

Global navigation satellite systems (GNSS) include various constellations of satellites orbiting the earth. Examples include the Global Positioning System (GPS) (operated by the United States), GLONASS (operated by Russia), Galileo (operated by the European Space Agency), and BeiDou (operated by China). Each satellite emits signals that include satellite identifiers, ephemeris data (indicative of the location and health of the satellite), and timestamps. A GNSS receiver unit can receive signals from multiple satellites in one or more constellations and use the timestamps to determine the propagation delay time from the satellite to the receiver. Given signals from at least three or four satellites (depending on the particular receiver design), a location (typically expressed as a set of coordinates that can include a latitude, a longitude, and/or an altitude), can be triangulated. Signals from more than a minimum number of satellites can be used to improve accuracy of the location.

Location determination using GNSS is subject to various sources of error, including variable delays in the ionosphere and/or troposphere, clock synchronization errors, ephemeris errors, and multipath errors (where the signal may not take a direct path to the receiver). Accuracy of location determination using GNSS triangulation techniques is often limited to a few meters under open sky conditions and becomes worse under limited-view conditions.

Various techniques have been developed to improve accuracy of GNSS location determination. For example, real-time kinematic positioning (RTK) is commonly used in surveying and certain other applications where improved accuracy is desired. RTK uses phase tracking of the GNSS carrier wave in addition to the information content of the signal to enhance location accuracy. RTK generally requires two receivers: a "base" unit located at a fixed position and a "rover" unit, each of which has a GNSS receiver system that is capable of determining the phase of the carrier wave in addition to the information content of the signal. In surveying applications, for example, the base unit is placed in an open area with a clear view of the sky and remains stationary, allowing a location fix to be determined and maintained. The rover unit is moved about the survey site to determine locations of various points of interest. The base unit transmits its observed carrier phase information to the rover unit, and the rover unit can use this additional input in generating its own location estimates. RTK can achieve location accuracy on the order of 1 cm under favorable conditions. Precise point positioning (PPP) is another technique that uses carrier phase in addition to the information content of the signal in determining a location. Unlike RTK, PPP does not require a base unit, but centimeter-level accuracy may require that the receiver remain stationary for a sufficient period of time, which can be on the order of minutes.

Techniques such as RTK and PPP can substantially improve accuracy of GNSS location measurements. However, multipath errors in particular remain a limiting factor for the precision of GNSS location measurements.

SUMMARY

Embodiments described herein relate to location-determining receiver systems that include two GNSS receiver antennas positioned in fixed relation to each other and separated by a short baseline (which can be any length short enough that atmospheric effects can be treated as being the same for both antennas, for example, lengths up to a few meters). Signals received by the two receiver antennas can be processed using techniques described herein to define a "virtual" antenna located at the midpoint between the two receiver antennas. For instance, a location can be determined for each receiver antenna using GNSS-based techniques (which can include enhanced-precision techniques such as RTK, PPP or the like), and the locations of the two antennas can be used to determine a location of the virtual antenna. As another example, GNSS observables from the two antennas, such as code, Doppler, and carrier phase, can be combined to provide a set of "virtual" observables for the virtual antenna, and GNSS-based techniques (which can include enhanced-precision techniques such as RTK, PPP or the like) can be applied to the virtual observables to determine a location of the virtual antenna. Combining signals or information from two antennas separated by a short baseline can improve accuracy of location estimates, e.g., by reducing multipath error.

Some embodiments relate to methods of determining location using a receiver system having a first antenna and a second antenna disposed in a fixed position relative to each other and defining a baseline. Global navigation satellite system (GNSS) signals from one or more GNSS satellites can be received at the first antenna and the second antenna of the receiver system. A first measured location can be determined using the GNSS signals received at the first antenna and independently of the GNSS signals received at the second antenna, and a second measured location can be determined using the GNSS signals received at the second antenna and independently of the GNSS signals received at the first antenna. The first and second measured locations can be combined to determine a location of a virtual antenna located at a midpoint of the baseline.

In various embodiments, combining the first and second measured locations includes computing an average of the first and second measured locations. The average can be, for example, a weighted average with weights determined based on reliability parameters associated with the first and second measured locations.

In various embodiments, combining the first and second measured locations can include: determining an orientation vector of the baseline between the first and second antennas; computing a first shifted location by shifting the first measured location toward the second antenna along the orientation vector by a distance equal to half the length of the baseline; computing a second shifted location by shifting the second measured location toward the first antenna along the orientation vector by a distance equal to half the length of the baseline; and computing an average of the first and second shifted locations. The average can be a weighted average with weights determined based on reliability parameters associated with the first and second measured locations.

In various embodiments, determining the first measured location can include performing a first real-time kinematic (RTK) analysis using information extracted from the GNSS signals received at the first antenna and additional information received from a base unit, and determining the second measured location can include performing a second RTK analysis using information extracted from the GNSS signals received at the second antenna and the additional information received from the base unit.

Some embodiments relate to methods of determining location using a receiver system having a first antenna and a second antenna disposed in a fixed position relative to each other and defining a baseline. Global navigation satellite system (GNSS) signals from one or more GNSS satellites can be received at the first antenna and at the second antenna. A first set of GNSS observables can be determined using the GNSS signals received at the first antenna and independently of the GNSS signals received at the second antenna, and a second set of GNSS observables can be determined using the GNSS signals received at the second antenna and independently of the GNSS signals received at the first antenna. The first and second sets of GNSS observables can be combined to produce a set of virtual GNSS observables for a virtual antenna at a midpoint of the baseline. A location of the virtual antenna can be determined using the set of virtual GNSS observables, for instance by performing a real-time kinematic (RTK) analysis using the virtual GNSS observables and additional information received from a base unit. In addition or instead, the virtual GNSS observables can be transmitted to another device and used in an RTK analysis to determine a location of the other device.

In various embodiments, the GNSS observables in each of the first and second sets of GNSS observables can include a code observable, a Doppler observable, and a carrier phase observable. For instance, combining the first and second sets of GNSS observables can include averaging the code observables and averaging the Doppler observables. As another example, an average carrier phase observable can be computed from a first carrier phase observable from the first set of GNSS observables and a second carrier phase observable from the second set of GNSS observables; a determination can be made whether a parity correction should be applied to the average carrier phase observable; and the parity correction can be applied to the average carrier phase observable in response to determining that the parity correction should be applied. In some embodiments, determining whether a parity correction should be applied to the average of the carrier phase observables can include: computing a bias based on a difference between the carrier phase observables from the first antenna and the second antenna and a difference between approximate locations of each antenna; offsetting the bias by a calibrated value to produce an offset bias; and determining whether the parity correction should be applied based on whether the offset bias is closer to an even integer or an odd integer. Applying the parity correction can include, for example, adding a half-cycle to the average of the carrier phase observables.

In various embodiments, combining the first and second sets of GNSS observables can include: estimating a difference in ambiguity parameters between a first carrier phase observable from the first set of GNSS observables and a second carrier phase observable from the second set of GNSS observables; applying a one-cycle correction to one of the first carrier phase observable or the second carrier phase observable in the event that the difference is an odd number; and averaging the first and second carrier phase observables.

Certain embodiments relate to position-determining systems. For example, a system can include: a first antenna and a second antenna positioned at a fixed baseline distance apart and configured to receive global navigation satellite system (GNSS) signals; receiver circuitry coupled to the first antenna and the second antenna and configured to extract observables from the GNSS signals received by the first antenna and the second antenna; and a signal processing engine coupled to the receiver circuitry and configured to determine, based on the observables, a virtual location of a virtual antenna located at a midpoint between the first antenna and the second antenna. The fixed baseline distance can be any distance short enough that atmospheric effects can be treated as being the same for both antennas, for example, distances up to a few meters.

In various embodiments, the signal processing engine can be configured such that determining the virtual location of the virtual antenna includes: determining, for each antenna, a measured location based on the observables from that antenna; and combining the respective measured locations for each antenna to determine the virtual location of the virtual antenna.

In various embodiments, the signal processing engine can be configured such that determining the virtual location of the virtual antenna includes: determining, for each of the first antenna and the second antenna, a set of GNSS observables from that antenna; combining the sets of GNSS observables from the first antenna and the second antenna to produce a set of virtual GNSS observables for the virtual antenna; and determining the location of the virtual antenna using the set of virtual GNSS observables.

In various embodiments, the system can also include a communication interface coupled to the signal processing engine and configured to obtain information from a base unit, and the signal processing engine can be configured such that determining the virtual location of the virtual antenna includes performing a real-time kinematic (RTK) analysis using the information from the base unit.

In various embodiments, the system can also include an inertial measurement unit (IMU) coupled to the signal processing engine and configured to determine an orientation of the first antenna and the second antenna, and the signal processing engine can be further configured such that determining the virtual location of the virtual antenna is based in part on the orientation of the first antenna and the second antenna.

The following detailed description, together with the accompanying drawings, will provide a better understanding of the nature and advantages of the claimed invention.

DETAILED DESCRIPTION

The following description of exemplary embodiments of the invention is presented for the purpose of illustration and description. It is not intended to be exhaustive or to limit the claimed invention to the precise form described, and persons skilled in the art will appreciate that many modifications and variations are possible. The embodiments have been chosen and described in order to best explain the principles of the invention and its practical applications to thereby enable others skilled in the art to best make and use the invention in various embodiments and with various modifications as are suited to the particular use contemplated.

Embodiments described herein relate to location determination using global navigation satellite system (GNSS) signals. As used herein, GNSS refers generally to any constellation of satellites that broadcast signals receivable by an antenna. A GNSS receiver system, which generally includes an antenna and appropriately-configured receiver and signal processing circuitry, can determine a location of the antenna using signals received by the antenna from multiple satellites. Examples of GNSS include the Global Positioning System (GPS) (operated by the United States), GLONASS (operated by Russia), Galileo (operated by the European Space Agency), and/or BeiDou (operated by China). GNSS satellites may transmit signals at one or more frequencies (or wavelengths). For instance, all GPS satellites currently broadcast at frequencies referred to as "L1" (1575.42 MHZ, wavelength about 0.19 m) and "L2" (1227.60 MHz, wavelength about 0.24 m); some also broadcast at "L5" (1176.45 MHZ, wavelength about 0.25 m). A given GNSS receiver system may be configured to detect and process signals from any or all of these or other GNSS satellites and may use conventional or other techniques to extract a location measurement from received satellite signals based on code phase and other data encoded in the signal (e.g., ephemeris data indicating satellite locations); other information such as carrier phase, Doppler shift, and the like may also be exploited. For example, where two GNSS receiver systems capable of determining carrier phase are available, real-time kinematics (RTK) can be used to produce a high-precision location estimate. Other techniques, such as precise point positioning (PPP), can also be used. A location determined using GNSS signals can be expressed in various formats, including coordinates indicating latitude, longitude, and/or altitude.

Embodiments described herein relate to location-determining devices and other GNSS receiver systems that include two antennas positioned in fixed relation to each other and separated by a short baseline. A "short" baseline can be of any length short enough that atmospheric effects can be treated as being the same for each antenna, for example, lengths up to a few meters. Shorter baselines, e.g., around 10 to 30 cm, may be more convenient for portable units. GNSS signals received from the two antennas can be processed using techniques described herein to define a "virtual" antenna located at the midpoint between the two receiver antennas. Use of a virtual antenna can improve accuracy of location estimates, e.g., by reducing multipath error.

Figure 1:
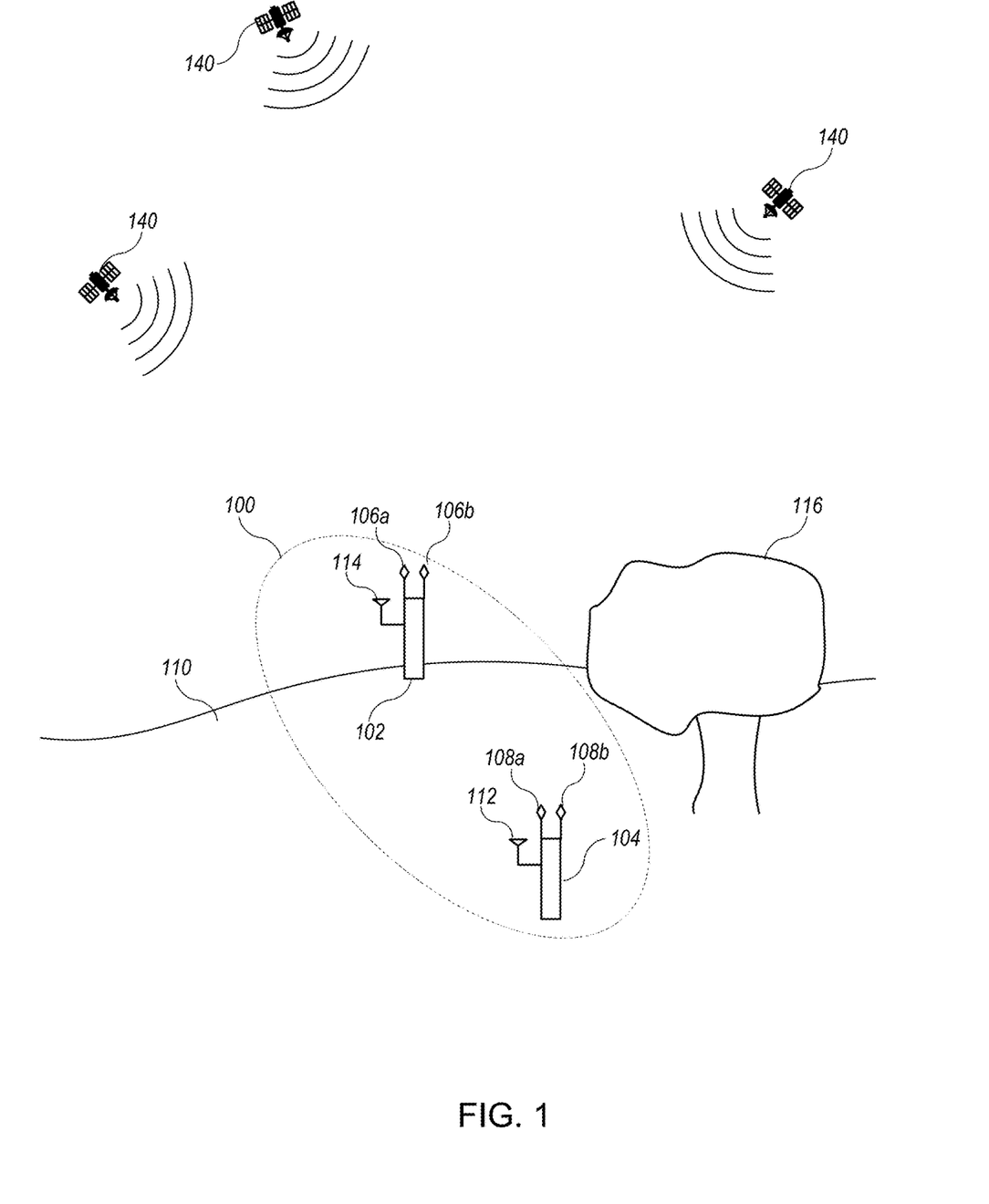
FIG. 1 shows a simplified diagram of a location-determining system according to some embodiments.

FIG. 1 shows a simplified diagram of a location-determining system 100 according to some embodiments. System 100 includes a base unit 102 and a rover unit 104 that can be used to measure locations in an area 110. Each of base unit 102 and rover unit 104 can be equipped with one or more antennas to receive GNSS signals from satellites 140. In the example shown, base unit 102 has GNSS antennas 106a, 106b, and rover unit 104 has GNSS antennas 108a, 108b. Base unit 102 can be placed at a convenient location within area 110 and remain in that location for the duration of a survey operation (e.g., minutes, hours, days, depending on the application). The location of base unit 102 can be selected to avoid obstructions such as tree 116, providing a clear view of the sky. In particular, base unit 102 can have a direct communication path to receive signals from GNSS satellites 140 located in orbit. The particular number of GNSS satellites 140 with which base unit 102 communicates can be at least three, at least four, or a larger number. Those skilled in the art will appreciate that GNSS satellites 140 are generally not in geostationary orbits and may move relative to base unit 102; base unit 102 may receive signals from different combinations of GNSS satellites 140 at different times. Ideally, base unit 102 is located in a place where it is able to continually receive signals from a sufficient number of GNSS satellites 140 to establish and maintain a high-quality location fix for as long as the survey operation continues. Base unit 102 can remain at a fixed location while rover unit 104 is moved around to different locations within area 110 to obtain location measurements. In some embodiments, base unit 102 and rover unit 104 can support high-precision location determination techniques, including carrier phase detection. Real-time kinematics (RTK) can be used to determine the location of rover unit 104 with high precision, and base unit 102 can communicate with rover unit 104 to implement RTK. Other techniques, such as precise point positioning (PPP), can also be used, and a base unit is not required. In some implementations, base unit 102 may use PPP to determine its own location while rover unit 104 implements RTK using carrier phase data and/or other information provided by base unit 102. Accordingly, base unit 104 can include a radio-frequency (RF) communication antenna 114, and rover unit 104 can include a RF communication antenna 112. Antennas 114 and 112 can support wireless communication (e.g., in the UHF band) between base unit 102 and rover unit 104.

As rover unit 104 is moved around within area 110, the GNSS signal quality may be affected by obstructions such as tree 116. In particular, rover unit 104 may be susceptible to multipath effects, in which some (or all) of the GNSS signals bounce off an obstruction rather than taking a direct path from a satellite 140 to receiver antennas 108a, 108b of rover unit 104. Such effects can introduce error that reduces the accuracy of the location determined from the GNSS signals. As described below, antennas 108a, 108b in rover unit 104 (and/or antennas 106a, 106b in base unit 102) can be used to compensate for multipath effects.

Figure 2A:
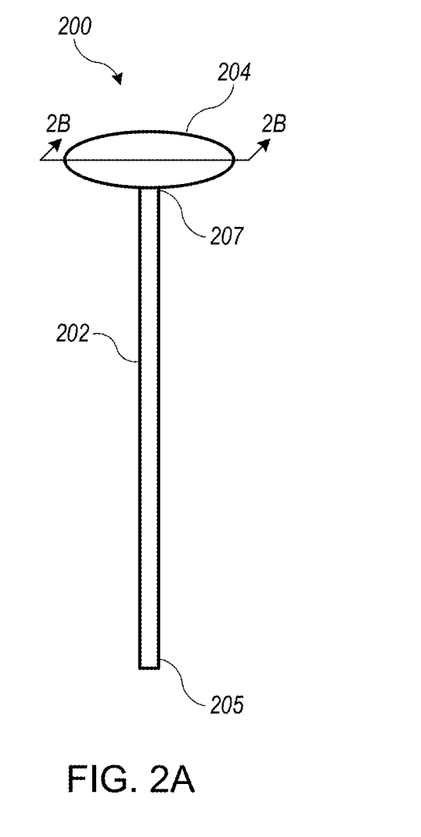
FIGS. 2A and 2B show views of a location-measuring device according to some embodiments, with FIG. 2A showing a simplified side view and FIG. 2B showing a simplified cross-section view.

FIG. 2A shows a simplified side view of a location-measuring device 200 according to some embodiments. Location-measuring device 200 can be used to implement rover unit 104 or base unit 102 of system 100 of FIG. 1. In some embodiments, each of rover unit 104 and base unit 102 can be an instance of location-measuring device 200, with the difference being in operation rather than hardware components. Location measuring device 200 can include a pole 202 and an electronics module 204 mounted at a top end 207 of pole 202. Bottom end 205 of pole 202 can be placed on the ground to support device 200, and pole 202 can be long enough to elevate electronics module 204 to a desired height above ground level. If desired, the length of pole 202 can be adjustable. Although not shown in FIG. 2, pole 202 can include or be attached to tripod legs, spikes, cleats, or other structures to further stabilize pole 202 during location measurements.

Figure 2B:
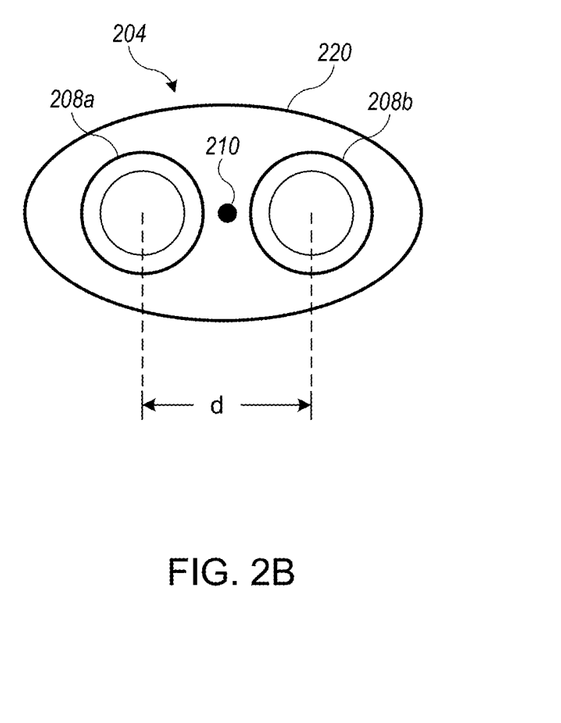

FIG. 2B shows a simplified cross-section view of electronics module 204, through line 2B of FIG. 2A. Electronics module 204 can have a housing 220, within which are mounted two GNSS antennas 208a, 208b having the same configuration. Each of antennas 208a, 208b can be sized and shaped to receive GNSS signals at one or more frequencies. In some embodiments, antennas 208a, 208b can also be used to determine a carrier phase of the GNSS signal, e.g., using known techniques. Antennas 208a, 208b can be oriented in the same direction and separated by a baseline distance (d), which is fixed for a particular electronics module. Distance d can be any distance short enough that atmospheric effects can be treated as being the same for each antenna, for example, distances up to a few meters. In some embodiments, d can be 30 cm or less, which can provide a convenient form factor for devices intended to be hand-carried by a user. In some embodiments, distance d can be 10 cm. A midpoint 210 between antennas 208a, 208b corresponds to the location of a virtual antenna. The location (latitude, longitude, and/or altitude) of the virtual antenna (i.e., of midpoint 210) can be determined using techniques described herein. In some embodiments, midpoint 210 can be aligned with the top end 207 of pole 202. In addition to antennas 208a, 208b, electronics module 204 can also include other components disposed within housing 220, such as receiver circuitry, signal processing engine(s), an inertial measurement unit, communication circuitry to communicate with a base unit (or rover unit), battery or other power source, and so on. The size and shape of housing 220 can be varied as desired, provided that there is sufficient space to house the relevant components.

Figure 3:
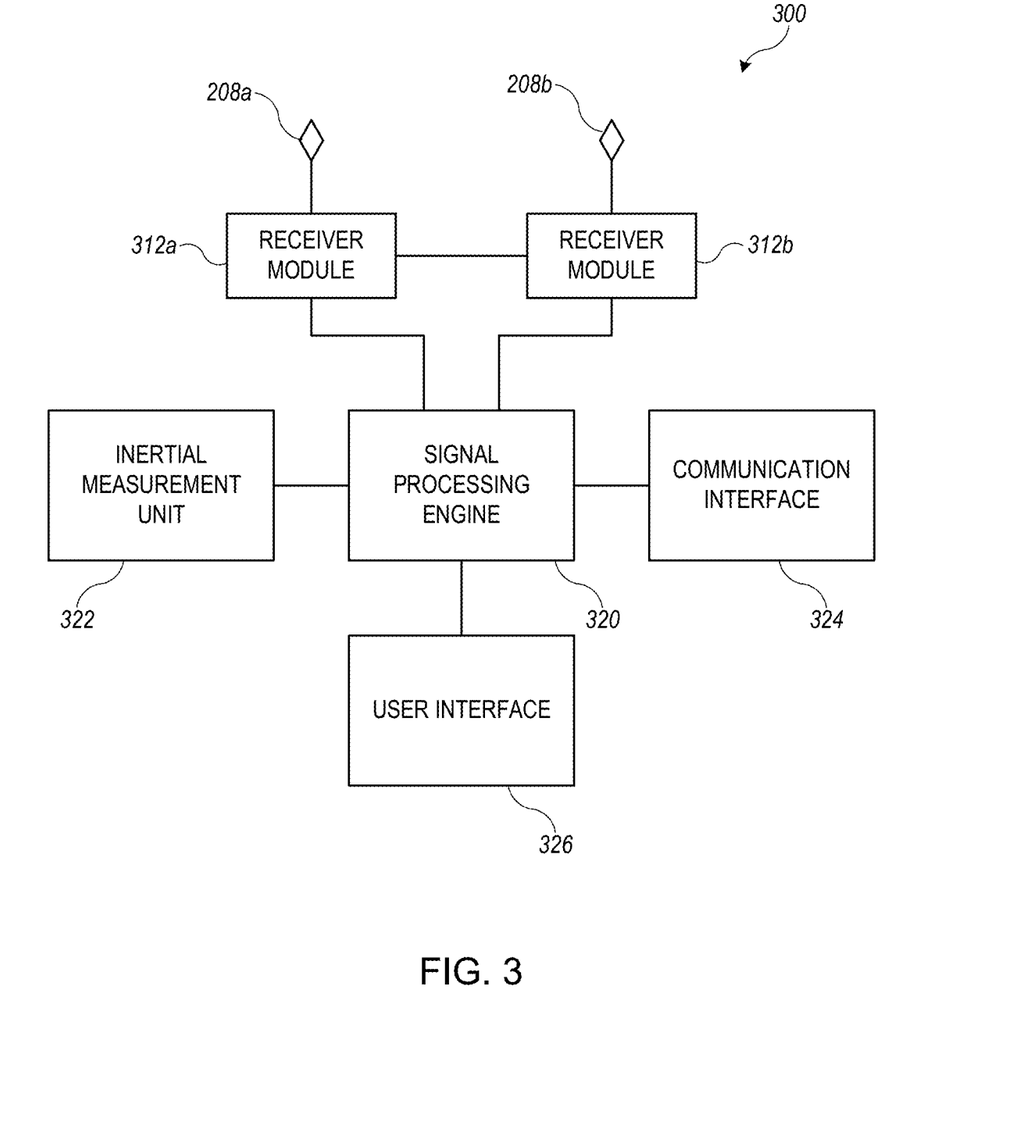
FIG. 3 shows a simplified block diagram of a GNSS receiver system according to some embodiments.

FIG. 3 shows a simplified block diagram of a GNSS receiver system 300, such as location-measuring device 200, according to some embodiments. In various embodiments, some or all components of GNSS receiver system 300 can be included in electronics module 204 of FIGS. 2A and 2B. As shown in FIG. 3, GNSS receiver system 300 can include antennas 208a, 208b; receiver modules 312a, 312b; a signal processing engine 320; an inertial measurement unit 322; a base unit interface component 324; and a user interface component 326.

Antennas 208a, 208b can be of the same size and configuration and tuned (or tunable) to GNSS signal frequencies. As described above, antennas 208a, 208b can be mounted in fixed relation to each other and oriented in the same direction, separated by a baseline distance d. Receiver modules 312a, 312b can be coupled to antennas 208a, 208b and can include electronic circuitry to amplify received GNSS signals, determine carrier phase, convert signals to baseband, and extract data from the signals. In some embodiments, some or all of the circuitry of receiver modules 312a, 312b can be shared between the two antennas. For instance, receiver modules 312a, 312b may share clock circuitry and/or other circuitry. If desired, both antennas 208a, 208b can be operated using a single receiver module. A particular implementation of antennas 208a, 208b and receiver modules 312a, 312b is not relevant to understanding the present disclosure; conventional or other implementations can be used.

Signal processing engine 320 can include logic circuitry (e.g., fixed-function ASIC and/or a programmable microprocessor or microcontroller) configured to perform signal processing operations on data provided by receiver modules 312a, 312b. For instance, signal processing engine 320 can be configured to determine a location (e.g., latitude, longitude, and altitude) based on the data provided by receiver modules 312a, 312b. Examples of techniques that can be implemented in signal processing engine 320 are described below.

Communication interface 324 can include RF communication circuitry, antennas and the like, which can be of conventional or other design. In some embodiments, communication interface 324 can be operated to provide data from a base unit (e.g., base unit 102 of FIG. 1) to a rover unit (e.g., rover unit 104) of FIG. 1. For instance, in embodiments where signal processing engine 320 of rover unit 104 implements RTK, communication interface 324 can be used to obtain carrier phase data and any other relevant data from base unit 102.

Inertial measurement unit (IMU) 322 can include a combination of sensors such as accelerometers, gyroscopes, compass, or the like, which can be of conventional or other design. In some embodiments, IMU 322 can be used to determine and provide a spatial orientation (e.g., pitch, roll, yaw) of electronics module 204. The spatial orientation provided by IMU 322 can be used in determining the location of a virtual antenna (e.g., as described below) and/or the base of pole 202.

User interface 326 can include components such as buttons, dials, keypad, display, touch screen, speakers, microphones, or the like to enable a user to interact with GNSS receiver system 300. For instance, a user may be able to initiate a location measurement using a button and/or read a location measurement using a display. These and/or other interactions can be supported. In some embodiments, GNSS receiver system 300 may be remotely operable and can include a communication interface to exchange signals with a remote control device. Wired or wireless communication protocols can be used, and a particular scheme for control input and data output is not relevant to understanding the present disclosure.

It will be appreciated that location-measuring device 200 and GNSS receiver system 300 are illustrative and that variations or modifications are possible. Receiver systems can have any desired form factor, provided that the two antennas can be accommodated. For example, the antennas may be mounted in fixed relation to each other on a vehicle or other movable structure or object and can be but need not be disposed inside a common housing. In addition, some or all components of GNSS receiver system 300 can be located remotely from other components. For instance, the signal processing engine may be housed in a separate device that communicates via wired or wireless channels with a device that includes the antennas, receiver modules, and IMU.

According to some embodiments, signal processing engine 320 can be configured (e.g., by programming and/or by design of suitable logic circuits) to combine data obtained using antennas 208a and 208b (and receiver modules 312a and 312b) in order to determine a location of a virtual antenna located at the midpoint 210 between antennas 208a and 208b. Various techniques can be used to combine the data from the two antennas. In some embodiments, signal processing engine 320 can perform an independent location determination for each of antennas 208a and 208b, then determine a location of the midpoint 210 based on the locations determined for the two antennas. In other embodiments, signal processing engine 320 can combine GNSS observables (e.g., code, Doppler, and carrier phase) obtained from antennas 208a and 208b to produce a set of virtual observables, then determine the location of the virtual antenna using the virtual observables. Examples will now be described.

Figure 4:
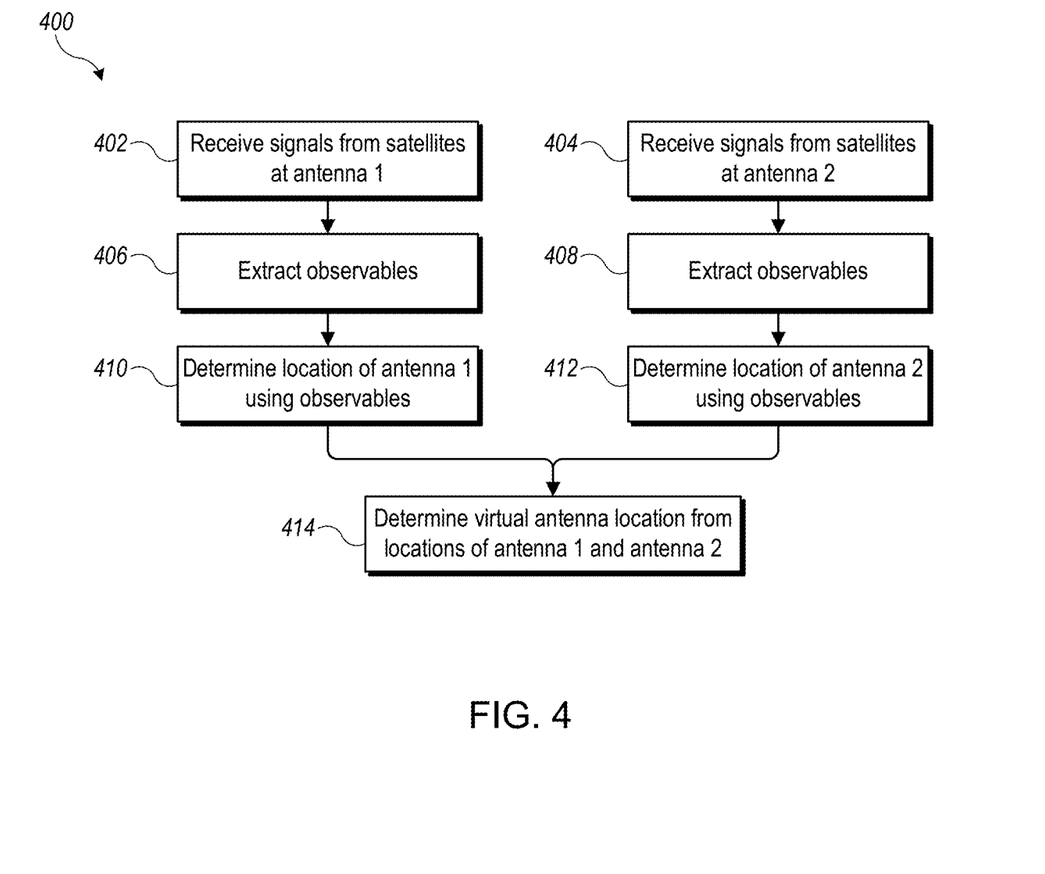
FIG. 4 shows a flow diagram of a process for determining a location of a virtual antenna according to some embodiments.

FIG. 4 shows a flow diagram of a process 400 for determining a location of a virtual antenna according to some embodiments. Process 400 can be implemented in GNSS receiver system 300 or other device or system having two antennas ("antenna 1" and "antenna 2") mounted in fixed relation to each other with a short baseline.

At blocks 402 and 404, antenna 1 (e.g., antenna 208a) and antenna 2 (e.g., antenna 208b) can each receive signals from GNSS satellites, including any or all GNSS satellites that are in view of the antennas at a given time. At blocks 406 and 408, observables for each antenna can be extracted from the received signals. (As used herein, an "observation" refers to a set of observables for a particular antenna from a particular GNSS satellite at a particular frequency.) The observables can include any data or information that can be extracted from a GNSS signal and used in determining a distance to the GNSS satellite that was the source of the signal. Examples include a code observable, a Doppler observable, and a carrier phase observable. Observables can be extracted independently for each antenna, satellite, and frequency. At blocks 410 and 412, locations of antenna 1 and antenna 2 can be determined using the observables. Determining the location of an antenna can include obtaining observables from that antenna with respect to multiple GNSS satellites, determining distance to each satellite using the observables, and computing a location of the antenna using triangulation or other techniques. In some embodiments, RTK, PPP, or other high-precision GNSS location-determination techniques can be incorporated into the location determination for each antenna. Where RTK is used, the same base unit can provide data for both antennas. Regardless of the particular implementation, the same location determination technique can be applied separately to the signals and/or observables from each of antenna 1 and antenna 2. Where this is the case, the location determination for antenna 1 is independent of antenna 2 and vice versa.

At block 414, a location of the virtual antenna can be determined using the locations of the two antennas. In some embodiments, the location of the virtual antenna can be determined by averaging the locations of antenna 1 and antenna 2. The average can be a weighted average. For instance, GNSS solutions typically provide a location and a covariance (or other metric) indicating accuracy or reliability of the location. The covariance (or other metric) can be used to determine weights such that a location with higher reliability is assigned greater weight.

Another approach to determining the location of the virtual antenna includes projecting the locations determined for antenna 1 and antenna 2 toward the midpoint 210. In these embodiments, orientation data from IMU 322 can be used to determine an orientation (in three-dimensional space) of the baseline between antenna 1 and antenna 2. For instance, the orientation data from IMU 322 can include roll, pitch and yaw angles defined relative to compass north (e.g., as determined by magnetic compass) and down (e.g., as determined by gravitational acceleration). Since the antennas are in fixed locations relative to the IMU, the roll, pitch, and yaw angles can be used to determine the spatial orientation of the baseline. The location determined by antenna 1 can be shifted in the direction of the baseline toward antenna 2 by a distance equal to half the baseline length d, and the location determined by antenna 2 can be shifted in the direction of the baseline toward antenna 1 by a distance equal to half the baseline length d. This results in two estimates of the location of midpoint 210. The two estimated midpoint locations can be averaged to determine a location of the virtual antenna. In some embodiments, the average can be a weighted average where the two estimated midpoint locations are assigned weights, e.g., based on covariance or other metrics indicating relative reliability of the two antenna locations.

It is noted that, prior to the present disclosure, averaging the locations determined for two antennas separated by a short baseline was not expected to yield any improvement in accuracy of location over using a single antenna. For high-precision techniques such as RTK, error is generally dominated by multipath error, and it was believed by those skilled in the art that, for a pair of antennas separated by a short baseline, multipath effects would be highly correlated between the two antennas; consequently, averaging would not reduce the multipath error. The inventors have discovered, among other things, that a baseline of a few centimeters (e.g., 10 cm in some embodiments) is sufficient to de-correlate the carrier-phase multipath effects between the two antennas to a sufficient degree that averaging of the antenna locations can improve overall accuracy.

Figure 5A:
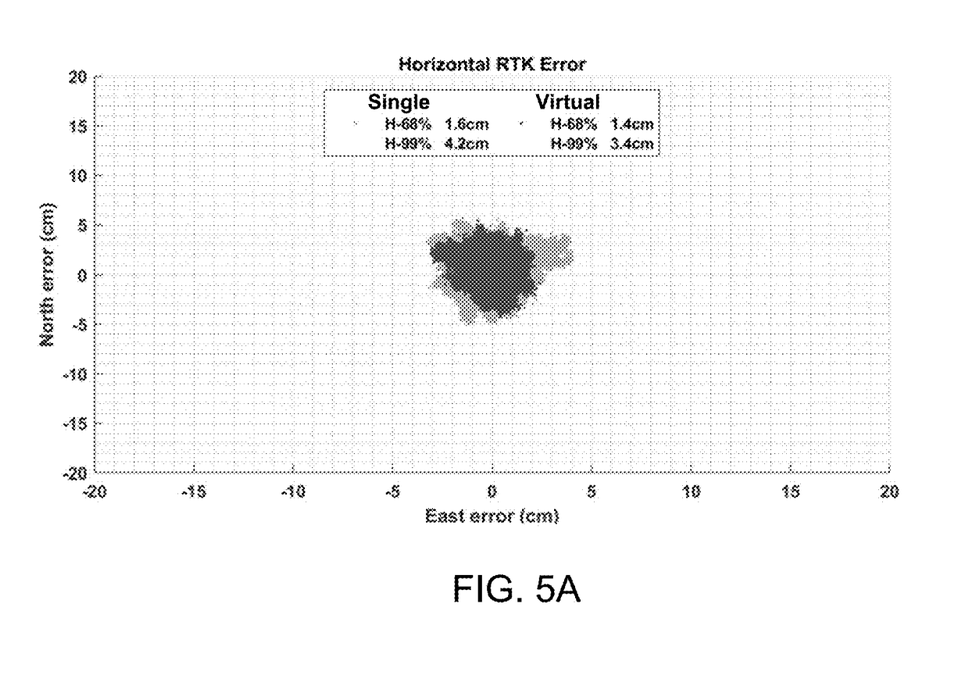
FIGS. 5A and 5B show plots of errors determined using a conventional location-determining technique and a location-determining technique according to some embodiments.
Figure 5B:
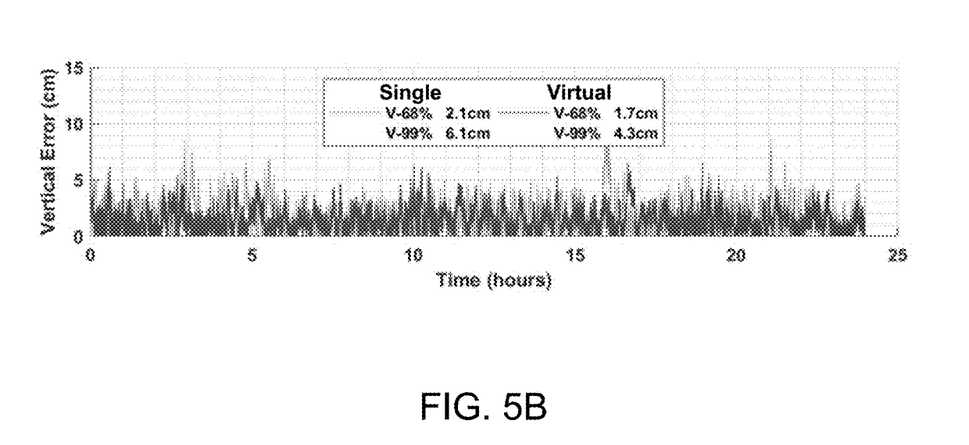

To illustrate the effectiveness of averaging techniques, FIGS. 5A and 5B show plots of errors for locations determined using: (1) a conventional RTK technique with a single rover antenna (amber); and (2) an implementation of process 400 using an average of RTK measurements for two antennas (purple). FIG. 5A shows a scatter plot of horizontal location error (in the north/south and east/west directions) over a 24-hour period, and FIG. 5B shows a plot of vertical location error as a function of time over the 24-hour period. In this example, location error is reduced by 19% in the horizontal and 29% in the vertical. As shown in FIG. 5B, the magnitude of error may depend on the particular time when a measurement is made, partly because the signal paths from GNSS satellites change with time. As shown in FIG. 5B, the largest errors observed using the averaging technique of process 400 can be significantly smaller than the largest errors observed using a conventional single antenna technique, and a process such as process 400 can help improve reliability of GNSS location measurements.

Figure 6:
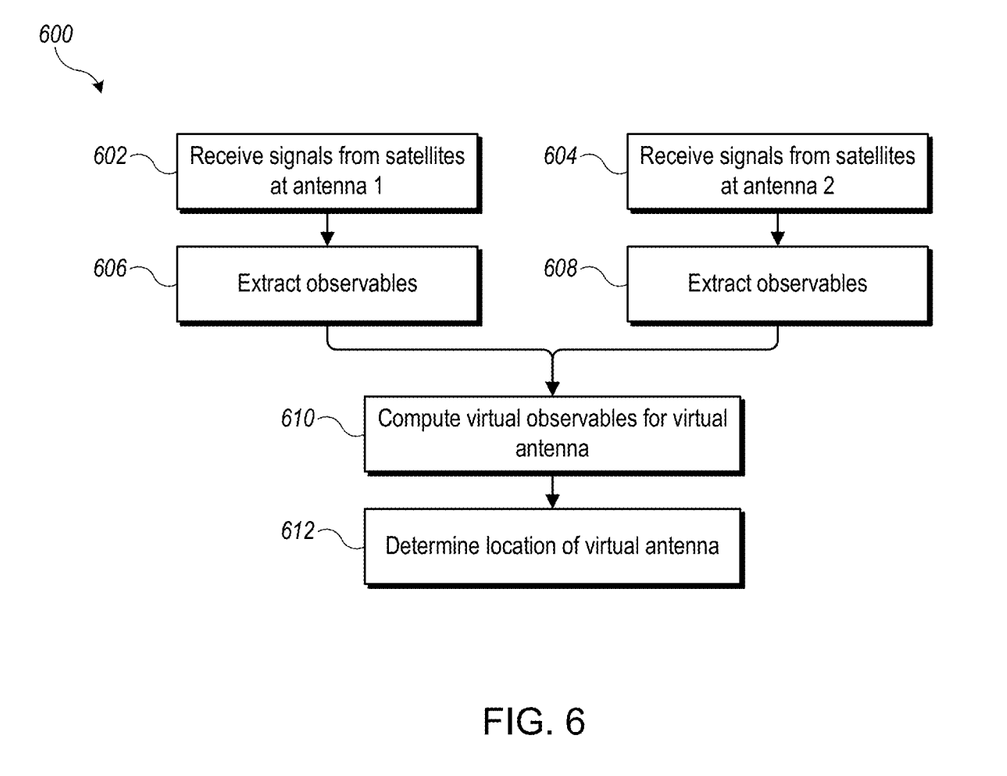
FIG. 6 shows a flow diagram of a process for determining a location according to some embodiments.

In other embodiments, signal processing engine 320 can combine the GNSS observables (e.g., code, Doppler, and carrier phase) from antennas 208a and 208b to produce a set of virtual observables. The location of the virtual antenna can be determined using the virtual observables. In addition, or instead, virtual observables can be sent to another device for use in RTK. For instance, if a pair of antennas 208a and 208b are included in a base unit that communicates with a rover unit, the virtual observables can be provided as the base-unit observables for determining the position of the rover. FIG. 6 shows a flow diagram of a process 600 for determining a location according to some embodiments. Process 600 can be implemented in GNSS receiver system 300 or other device or system having two antennas ("antenna 1" and "antenna 2") mounted in fixed relation to each other with a short baseline. In some embodiments, antenna 1 and antenna 2 can run on the same receiver and/or be controlled by the same clock.

At blocks 602 and 604, antenna 1 (e.g., antenna 208a) and antenna 2 (e.g., antenna 208b) can receive signals from GNSS satellites. At blocks 606 and 608, observables for each antenna can be extracted from the received signals. As used herein, "observables" can include any data or information that can be extracted from a GNSS signal and used to determine a distance to the GNSS satellite that was the source of the signal, including the code, Doppler, and carrier phase observables as mentioned above. The observables can be extracted independently for each antenna. In some embodiments, blocks 602-608 can be identical to blocks 402-408 of process 400.

At block 610, a set of "virtual" observables is computed for a virtual antenna located at the midpoint between antenna 1 and antenna 2. For example, a virtual code observable can computed as the average of the code observables from the two antennas. A virtual Doppler observable can be computed as the average of the Doppler observables from the two antennas. The carrier phase observable, however, includes an ambiguity term that is expected to be an integer number of wavelengths. More specifically, the carrier phase observable $\Phi_i$ for an antenna i can be defined as:

$$\Phi_i = (1/\lambda) * (dist_i + I_i + T_i + clock_i + bias_i + N_i), \quad (1)$$

where $\lambda$ is the GNSS carrier wavelength; $dist_i$ can be computed using an approximate location of the antenna (e.g., based on an approximate location of the location-measuring unit and/or the antenna); $I_i$ and $T_i$ represent ionospheric and tropospheric errors; $clock_i$ is a clock offset; $bias_i$ is a receiver bias; and $N_i$ is an ambiguity in the number of wavelengths between the satellite and the antenna. It should be noted that the ambiguity $N_i$ is expected to be an integer. If the carrier phase observables $\Phi_1$ and $\Phi_2$ for antennas 1 and 2 are averaged, the result can be expressed as:

$$\Phi_m = \left(\frac{1}{\lambda}\right) * \left(\frac{dist_1 + dist_2}{2} + \frac{I_1 + I_2}{2} + \frac{T_1 + T_2}{2} + \frac{clock_1 + clock_2}{2} + \frac{bias_1 + bias_2}{2} + \frac{N_1 + N_2}{2}\right). \quad (2)$$

The ambiguity term, $(N_1+N_2)/2$, may be either an integer or half-integer, depending on whether the parities (even or odd) of $N_1$ and $N_2$ match or do not match. When computing a virtual carrier phase observable for a virtual antenna, it can be useful to adjust $\Phi_m$ by half a cycle in the event that the parities of $N_1$ and $N_2$ do not match. This maintains the integer nature of the ambiguity and is compatible with existing RTK or PPP algorithms that entail ambiguity resolution. However, the quantity $(N_1+N_2)/2$ may not be known.

In various embodiments, additional computations can be used to determine whether the parities of $N_1$ and $N_2$ match. In one approach, a bias can be computed as:

$$B = (\Phi_1 - \Phi_2) - \frac{1}{\lambda} * (dist_1 - dist_2), \quad (3)$$

where $dist_1$ and $dist_2$ can be determined using an approximate location of each antenna (e.g., based on an approximate location of the location-measuring unit and an offset, e.g., half the baseline distance, for each antenna). For an antenna pair with a small baseline, when $\Phi_2$ is subtracted from $\Phi_1$, the differences in ionospheric error $(I_1-I_2)$ and tropospheric error $(T_1-T_2)$ are negligible, since the antennas are located close to each other. In addition, where receivers for the two antennas are controlled by the same clock, the difference between $clock_1$ and $clock_2$ is constant for any observation and can be determined by calibration using known techniques. Likewise, assuming a well-designed receiver, the receiver bias difference $(bias_1-bias_2)$ is constant for all signals on a given band, and can be solved for in real time. Accordingly, an offset value $$\text{offset} = (clock_1 - clock_2) + (bias_1 - bias_2) \quad (4)$$

can be determined by calibration (e.g., using known techniques). In embodiments where the receivers for the two antennas are controlled by the same clock and are also initialized simultaneously, the value of this offset can be pre-calibrated. In other embodiments, the value of the offset can be calibrated on the fly.

Regardless of the particular method used to determine the offset in Eq. (4), if the value $B_0$=B−offset (where B is given by Eq. (3)) is close to an odd integer, it can be inferred that the parities of $N_1$ and $N_2$ do not match; if $B_0$ is close to an even integer, it can be inferred that the parities of $N_1$ and $N_2$ match. In some embodiments, when it is inferred that the parities of $N_1$ and $N_2$ do not match, the average phase observable Øm computed according to Eq. (2) can be adjusted by adding (or subtracting) half a cycle to obtain the virtual phase observable; when the parities of $N_1$ and $N_2$ match, no adjustment is applied, and the virtual phase observable can be the same as the average phase observable. It is also noted that $B_0$ can deviate from an integer value due to multipath errors, and the further $B_0$ is from an integer, the larger the multipath error. In some embodiments, this information can be used to weight observations in the estimator that determines location of the virtual antenna.

Another approach to determining whether a parity correction should be applied to Φm can include directly estimating the difference $N_1-N_2$; for instance, each of $N_1$ and $N_2$ can be separately estimated. If the difference is odd, the parities do not match, and a one-cycle compensation can be applied to $\Phi_1$ or $\Phi_2$ prior to averaging; if the difference is even, the parities match, and no compensation is applied. In either case, the average carrier phase $\Phi_m$ can be used as the virtual carrier phase.

More generally, regardless of the particular technique used to determine whether a parity correction should be applied, the virtual carrier phase observable for the virtual antenna can be defined as $\Phi_m$, as modified by any applicable parity correction.

At block 612, a location of the virtual antenna can be computed using the virtual observables. Determining the location of the virtual antenna can include obtaining virtual observables with respect to multiple GNSS satellites, determining distance to each satellite using the virtual observables, and computing a location of the virtual antenna using triangulation or other techniques. In some embodiments, RTK, PPP, or other high-precision GNSS location-determination techniques can be incorporated into the location determination for the virtual antenna. In addition or instead, the virtual observables can be communicated to another device whose location is to be determined using RTK. It should be understood that either or both devices participating in an RTK process can implement a virtual antenna as described herein, and virtual observables can be provided from one device to the other.

By averaging observables, process 600 can provide noise reduction in the observables (by a factor of $\sqrt{2}$ in some embodiments), which can lead to improved location accuracy regardless of the particular location-determining technique used.

It should be noted that in process 600, unlike process 400, RTK or PPP (which can be computationally intensive) is performed for only one antenna—the virtual antenna—rather than being performed separately for each physical antenna. Accordingly, for a given amount of available computing power, process 600 can increase throughput and/or reduce power consumption relative to process 400.

Either process 400 or process 600 can provide reduction in carrier-phase multipath errors. In addition, either process can provide more reliable observation weights than a single-antenna system, which can contribute to increased accuracy of location measurements.

While the invention has been described with reference to specific embodiments, those skilled in the art will appreciate that variations and modifications are possible. Any algorithms and techniques for determining location of an antenna (or receiver) using GNSS satellite data can be used, and any number or combination of GNSS observations can be incorporated into the location determination. In some embodiments, signals can be obtained at multiple frequencies (e.g., any or all of the L1, L2, and L5 frequencies used in GPS signals), and observables extracted from signals at different frequencies can be combined. The particular physical structures of the antennas can be implemented as desired, provided that the antennas are sized and shaped such that they can be mounted with a short baseline. Having the same physical configuration for both antennas can improve reliability of the measurements.

Location measurements determined using techniques described herein have a variety of applications. Depending on the particular application, location data can be output to a user, stored in a computer-readable storage medium, inserted as an annotation in a map or other survey record, and so on.

In some embodiments, dual-antenna systems can be implemented in tilted-pole survey systems. As described above, an inertial measurement unit in the survey pole can determine an orientation of the pole, and location measurements can be modified to account for tilt or rotation of the pole. Dual-antenna systems can be included in the rover unit and/or the base unit, and techniques described herein may be applied to implement a virtual antenna for either or both of the rover unit and the base unit. In the case of a base unit, which may remain in a fixed location for an extended period of time (minutes, hours, or days), the virtual antenna can reduce multipath error, thereby providing a more accurate location determination for the base unit, which in turn can improve accuracy for the rover unit. A location of a rover unit can be determined using RTK with reference to the virtual antenna of the base unit, regardless of whether the rover unit also implements a virtual antenna. Signal processing circuitry can be disposed in the rover unit and/or the base unit as desired.

Dual-antenna systems can also be implemented in other applications where highly accurate location determination is desired. For example, a pair of GNSS receiver antennas can be mounted on a vehicle at a fixed baseline distance from each other (e.g., 20 cm up to 2-3 meters), and techniques described herein may be applied to implement a virtual antenna. The improved accuracy can be beneficial in applications such as autonomous vehicles.

While various circuits and components are described herein with reference to particular blocks, it is to be understood that these blocks are defined for convenience of description and are not intended to imply a particular physical arrangement of component parts. The blocks need not correspond to physically distinct components, and the same physical components can be used to implement aspects of multiple blocks. Components described as dedicated or fixed-function circuits can be configured to perform operations by providing a suitable arrangement of circuit components (e.g., logic gates, registers, switches, etc.); automated design tools can be used to generate appropriate arrangements of circuit components implementing operations described herein. Components described as processors or microprocessors can be configured to perform operations described herein by providing suitable program code. Various blocks might or might not be reconfigurable depending on how the initial configuration is obtained. Embodiments of the present invention can be realized in a variety of apparatus including electronic devices implemented using a combination of circuitry and software.

All processes described herein are also illustrative and can be modified. Operations can be performed in a different order from that described, to the extent that logic permits; operations described above may be omitted or combined; and operations not expressly described above may be added.

Computer programs incorporating features of the present invention that can be implemented using program code may be encoded and stored on various computer readable storage media; suitable media include magnetic disk or tape, optical storage media such as compact disk (CD) or DVD (digital versatile disk), flash memory, and other non-transitory media. (It is understood that "storage" of data is distinct from propagation of data using transitory media such as carrier waves.) Computer readable media encoded with the program code may include an internal storage medium of a compatible electronic device and/or external storage media readable by the electronic device that can execute the code. In some instances, program code can be supplied to the electronic device via Internet download or other transmission paths.

Accordingly, although the invention has been described with respect to specific embodiments, it will be appreciated that the invention is intended to cover all modifications and equivalents within the scope of the following claims.

What is claimed is:

1. A method comprising:
receiving global navigation satellite system (GNSS) signals from one or more GNSS satellites at a first antenna of a receiver system and at a second antenna of the receiver system, wherein the first antenna and the second antenna are disposed in a fixed position relative to each other and define a baseline;
determining a first measured location using the GNSS signals received at the first antenna and independently of the GNSS signals received at the second antenna;
determining a second measured location using the GNSS signals received at the second antenna and independently of the GNSS signals received at the first antenna; and
combining the first and second measured locations to determine a location of a virtual antenna located at a midpoint of the baseline.

2. The method of claim 1 wherein combining the first and second measured locations includes computing an average of the first and second measured locations.

3. The method of claim 2 wherein the average is a weighted average with weights determined based on reliability parameters associated with the first and second measured locations.

4. The method of claim 1 wherein combining the first and second measured locations includes:

determining an orientation vector of the baseline between the first and second antennas;
computing a first shifted location by shifting the first measured location toward the second antenna along the orientation vector by a distance equal to half the length of the baseline;
computing a second shifted location by shifting the second measured location toward the first antenna along the orientation vector by a distance equal to half the length of the baseline; and
computing an average of the first and second shifted locations.

5. The method of claim 4 wherein the average is a weighted average with weights determined based on reliability parameters associated with the first and second measured locations.

6. The method of claim 1 wherein:
determining the first measured location includes performing a first real-time kinematic (RTK) analysis using information extracted from the GNSS signals received at the first antenna and additional information received from a base unit; and
determining the second measured location includes performing a second RTK analysis using information extracted from the GNSS signals received at the second antenna and the additional information received from the base unit.

7. A method comprising:
receiving global navigation satellite system (GNSS) signals from one or more GNSS satellites at a first antenna of a receiver system and at a second antenna of the receiver system, wherein the first antenna and the second antenna are disposed in a fixed position relative to each other and define a baseline;
determining a first set of GNSS observables using the GNSS signals received at the first antenna and independently of the GNSS signals received at the second antenna;
determining a second set of GNSS observables using the GNSS signals received at the second antenna and independently of the GNSS signals received at the first antenna;
combining the first and second sets of GNSS observables to produce a set of virtual GNSS observables for a virtual antenna at a midpoint of the baseline; and
determining a location of the virtual antenna using the set of virtual GNSS observables.

8. The method of claim 7 wherein the GNSS observables in each of the first and second sets of GNSS observables include a code observable, a Doppler observable, and a carrier phase observable.

9. The method of claim 8 wherein combining the first and second sets of GNSS observables includes averaging the code observables and averaging the Doppler observables.

10. The method of claim 8 wherein combining the first and second sets of GNSS observables includes:
computing an average carrier phase observable from a first carrier phase observable from the first set of GNSS observables and a second carrier phase observable from the second set of GNSS observables;
determining whether a parity correction should be applied to the average carrier phase observable; and
applying the parity correction to the average carrier phase observable in response to determining that the parity correction should be applied.

11. The method of claim 10 wherein determining whether a parity correction should be applied to the average of the carrier phase observables includes:
computing a bias based on a difference between the carrier phase observables from the first antenna and the second antenna and a difference between approximate locations of each antenna;
offsetting the bias by a calibrated value to produce an offset bias; and
determining whether the parity correction should be applied based on whether the offset bias is closer to an even integer or an odd integer.

12. The method of claim 10 wherein applying the parity correction includes adding a half-cycle to the average of the carrier phase observables.

13. The method of claim 8 wherein combining the first and second sets of GNSS observables includes:
estimating a difference in ambiguity parameters between a first carrier phase observable from the first set of GNSS observables and a second carrier phase observable from the second set of GNSS observables;
applying a one-cycle correction to one of the first carrier phase observable or the second carrier phase observable in the event that the difference is an odd number; and
averaging the first and second carrier phase observables.

14. The method of claim 7 wherein determining the location of the virtual antenna includes performing a real-time kinematic (RTK) analysis using the virtual GNSS observables and additional information received from a base unit.

15. The method of claim 7 further comprising:
transmitting one or more of the virtual GNSS observables to a rover device whose location is to be determined using a real-time kinematic (RTK) analysis.

16. A system comprising:
a first antenna and a second antenna positioned at a fixed baseline distance apart and configured to receive global navigation satellite system (GNSS) signals;
receiver circuitry coupled to the first antenna and the second antenna and configured to extract observables from the GNSS signals received by the first antenna and the second antenna; and
a signal processing engine coupled to the receiver circuitry and configured to determine, based on the observables, a virtual location of a virtual antenna located at a midpoint between the first antenna and the second antenna.

17. The system of claim 16 wherein the fixed baseline distance is less than a meter.

18. The system of claim 16 wherein the signal processing engine is further configured such that determining the virtual location of the virtual antenna includes:
determining, for each antenna, a measured location based on the observables from that antenna; and
combining the respective measured locations for each antenna to determine the virtual location of the virtual antenna.

19. The system of claim 16 wherein the signal processing engine is further configured such that determining the virtual location of the virtual antenna includes:
determining, for each of the first antenna and the second antenna, a set of GNSS observables from that antenna;
combining the sets of GNSS observables from the first antenna and the second antenna to produce a set of virtual GNSS observables for the virtual antenna; and determining the location of the virtual antenna using the set of virtual GNSS observables.

20. The system of claim 16 further comprising:
a communication interface coupled to the signal processing engine and configured to obtain information from a base unit,
wherein the signal processing engine is further configured such that determining the virtual location of the virtual antenna includes performing a real-time kinematic (RTK) analysis using the information from the base unit.

21. The system of claim 16 further comprising:
an inertial measurement unit (IMU) coupled to the signal processing engine and configured to determine an orientation of the first antenna and the second antenna,
wherein the signal processing engine is further configured such that determining the virtual location of the virtual antenna is based in part on the orientation of the first antenna and the second antenna.

* * * * *